UNITED STATES PATENT OFFICE.

ARTHUR A. LIBBY, OF CHICAGO, ILLINOIS.

IMPROVEMENT IN PRESERVING RAW MEATS.

Specification forming part of Letters Patent No. 213,825, dated April 1, 1879; application filed January 29, 1879.

*To all whom it may concern:*

Be it known that I, ARTHUR A. LIBBY, of Chicago, in the State of Illinois, have invented certain new and useful Improvements in the Process of Preserving Raw Meats; and I do hereby declare that the following is a clear, full, and exact description thereof, which will enable others skilled in the art to which it appertains to make and use the same.

My invention relates to the preservation of meats in the raw state.

The use of measures for protecting the packing and slaughtering houses as far as possible from the fermentative agencies of air, such as are known to this art, is recommended as preliminary to the packing of the meats in the vessels in which it is to be preserved. These, however, I do not claim.

It is well known that smearing the walls of rooms with glue or some other sticky substance has the effect to arrest lacteria floating in the air; also, that screens and such like provisions prevent the access of the ferment of the air to such rooms. Not claiming this, my process consists of the following steps:

I take the meat, after it has been slaughtered, in pieces of proper size, and place them in a can or box which is capable of being hermetically sealed. I then close such can or box with the exception of a small hole in the cover thereof and an injecting-tube extending down through the cover of the can or box perpendicularly and reaching nearly to the bottom of the same. The meat is then suspended within the can or box, preferably without contact with the top, bottom, or sides of the same, so that there is a quantity of air around the meat in the can. I then attach to the outer end of the injecting-tube a pipe, through which I force into the can or box a current of hot calcined air, which, passing into the can and around the meat, issues therefrom through the small hole in the center of the cover without, however, cooking the meat. Before placing in the can the meat is slightly surface-hardened in a hot oven, or submitted to heat or briefly submerged in a bath of hot odorless fat, in order to prevent the escape of the juices from the same.

After the meat has been placed in the can, the air which is forced through the same, as described, is calcined by passing it through bent heated platinum tubes, in order that it may be entirely freed from the germs of fermentation which it would otherwise contain. The pressure and current of hot calcined air is continued through the can or box a sufficient length of time to destroy all its germs of decomposition. By this operation also the exterior surface of the meat is sufficiently hardened to prevent the escape of the juices therefrom.

When the process of injecting the hot calcined air has been carried on long enough to expel the natural air from the can and its contents I then close the hole in the center of the can or box cover, and instantly, and while the hot current is being forced in, hermetically close the mouth of the injecting-tube. With this view the outer end of the tube may be of a soft flexible iron, so that it can be easily squeezed or pressed together when the pipe is removed, or it may be closed with a tap.

In addition to the use of heat to harden the surface of the meat before it is put into the can, I sometimes employ a solution of bisulphite of lime or salicylic acid.

I do not claim the can herein described, but have alluded to the structure of the same simply as necessarily incident to a clear comprehension of the process which is the subject of this application.

What I claim as my invention, and desire to secure by Letters Patent, is—

The process of preserving raw meat and retaining the juices of the same, which consists in hardening the exterior surface of the meat, as described, placing the meat in a can or box, preferably without contact with the interior thereof, closing the said can or box with the exception of the inlet and outlet for air, forcing through said can or box a current of hot calcined air, in the manner herein described, and then hermetically sealing the box or can, as herein set forth.

In testimony that I claim the foregoing as my own I affix my signature in presence of two witnesses.

ARTHUR ALBION LIBBY.

Witnesses:
 LUTHER CHAD. YOUNG,
 ROBERT ALEXANDER STITT.